US011438296B1

(12) United States Patent
Borg et al.

(10) Patent No.: US 11,438,296 B1
(45) Date of Patent: *Sep. 6, 2022

(54) SYSTEM AND METHOD FOR MANAGING NOTIFICATIONS FROM PUBLISHED APPLICATIONS

(71) Applicant: Parallels International GmbH, Schaffhausen (CH)

(72) Inventors: Marco Borg, Sliema (MT); Nikolay Dobrovolskiy, Moscow (RU); Serguei M. Beloussov, Costa Del Sol (SG)

(73) Assignee: Parallels International GMBH, Schaffhausen (CH)

( * ) Notice: Subject to any disclaimer, the term of this patent is extended or adjusted under 35 U.S.C. 154(b) by 64 days.

This patent is subject to a terminal disclaimer.

(21) Appl. No.: 17/087,576

(22) Filed: Nov. 2, 2020

Related U.S. Application Data

(63) Continuation of application No. 15/878,581, filed on Jan. 24, 2018, now Pat. No. 10,826,861.

(51) Int. Cl.
*H04L 51/02* (2022.01)
*H04L 51/224* (2022.01)
*H04L 67/01* (2022.01)
*H04L 67/55* (2022.01)

(52) U.S. Cl.
CPC .............. *H04L 51/24* (2013.01); *H04L 67/26* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,738,975 B1 * | 5/2004 | Yee | G06F 9/541 719/310 |
| 7,937,433 B1 | 5/2011 | Kumar | |
| 8,825,836 B1 * | 9/2014 | Gibson | H04L 51/24 709/224 |
| 9,118,614 B1 * | 8/2015 | Rogers | H04L 51/24 |
| 9,317,195 B1 * | 4/2016 | Grechishkin | G06F 3/0482 |
| 10,142,213 B1 * | 11/2018 | Hart | H04L 67/18 |
| 10,462,080 B1 | 10/2019 | Jones et al. | |
| 10,754,518 B1 * | 8/2020 | Bell | H04W 12/06 |
| 10,826,861 B1 * | 11/2020 | Borg | H04L 51/24 |
| 10,887,253 B1 * | 1/2021 | Synytskyy | H04L 51/02 |
| 2004/0083271 A1 | 4/2004 | Tosey | |
| 2007/0067780 A1 * | 3/2007 | Kumar | G06F 9/542 719/318 |
| 2007/0174395 A1 * | 7/2007 | Bostick | G06F 16/27 709/206 |
| 2008/0181377 A1 | 7/2008 | Qiu et al. | |
| 2009/0113451 A1 * | 4/2009 | Grigsby | G06F 9/542 719/318 |
| 2011/0238766 A1 | 9/2011 | Lew et al. | |

(Continued)

*Primary Examiner* — Nasser M Goodarzi
*Assistant Examiner* — Terrika Peterson
(74) *Attorney, Agent, or Firm* — Rosenberg, Klein & Lee

(57) ABSTRACT

Disclosed are systems and methods for managing notifications from published applications. A method for managing notifications from one or more published applications includes detecting, by a server, a notification from the one or more published applications launched by a user at a client device, forming a notification packet containing information from the notification, and causing the notification packet to be provided to the client device.

18 Claims, 10 Drawing Sheets

(56) References Cited

U.S. PATENT DOCUMENTS

| | | | |
|---|---|---|---|
| 2013/0205218 A1 | 8/2013 | Abuelsaad et al. | |
| 2014/0201289 A1* | 7/2014 | Wheeler | G06F 16/176 |
| | | | 709/204 |
| 2014/0372516 A1* | 12/2014 | Watte | H04L 51/043 |
| | | | 709/203 |
| 2015/0120849 A1* | 4/2015 | Thies | H04W 72/0493 |
| | | | 709/206 |
| 2016/0164810 A1* | 6/2016 | Wolz | H04L 51/24 |
| | | | 709/206 |
| 2016/0323226 A1 | 11/2016 | Stuntebeck et al. | |
| 2017/0208028 A1 | 7/2017 | Lehtpuu | |
| 2018/0139506 A1* | 5/2018 | Torres Milano | ............... |
| | | | H04N 21/25866 |
| 2018/0205715 A1* | 7/2018 | Ingale | H04L 63/062 |
| 2018/0248829 A1 | 8/2018 | Hardee et al. | |
| 2019/0260879 A1* | 8/2019 | Raleigh | H04M 15/83 |

* cited by examiner

SYSTEM AND METHOD FOR MANAGING NOTIFICATIONS FROM PUBLISHED APPLICATIONS

RELATED APPLICATIONS

This application is a continuation application of co-pending U.S. patent application Ser. No. 15/878,581, filed Jan. 24, 2018, which is herein incorporated by reference.

FIELD OF TECHNOLOGY

The present disclosure relates generally to the field of remote application management, and more specifically, to systems and methods for managing notifications from published applications.

BACKGROUND

In virtual desktop environments, users often login to a terminal session and then launch particular applications, or use a native or web client to launch published applications that they may use throughout the day. At particular times, the users may minimize the terminal session, published application, web client, or native client.

Since notifications that occur at the terminal session are not caught and forwarded to a user's client device, the notification may not be received at all by a user. This is clearly a disadvantage as the user is not able to experience all of the application's features. For example, launching a published Skype application will not pop up a notification when you receive an instant message.

Therefore, the inventors have described herein methods and systems managing notifications from published applications.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

SUMMARY

Figure 1:
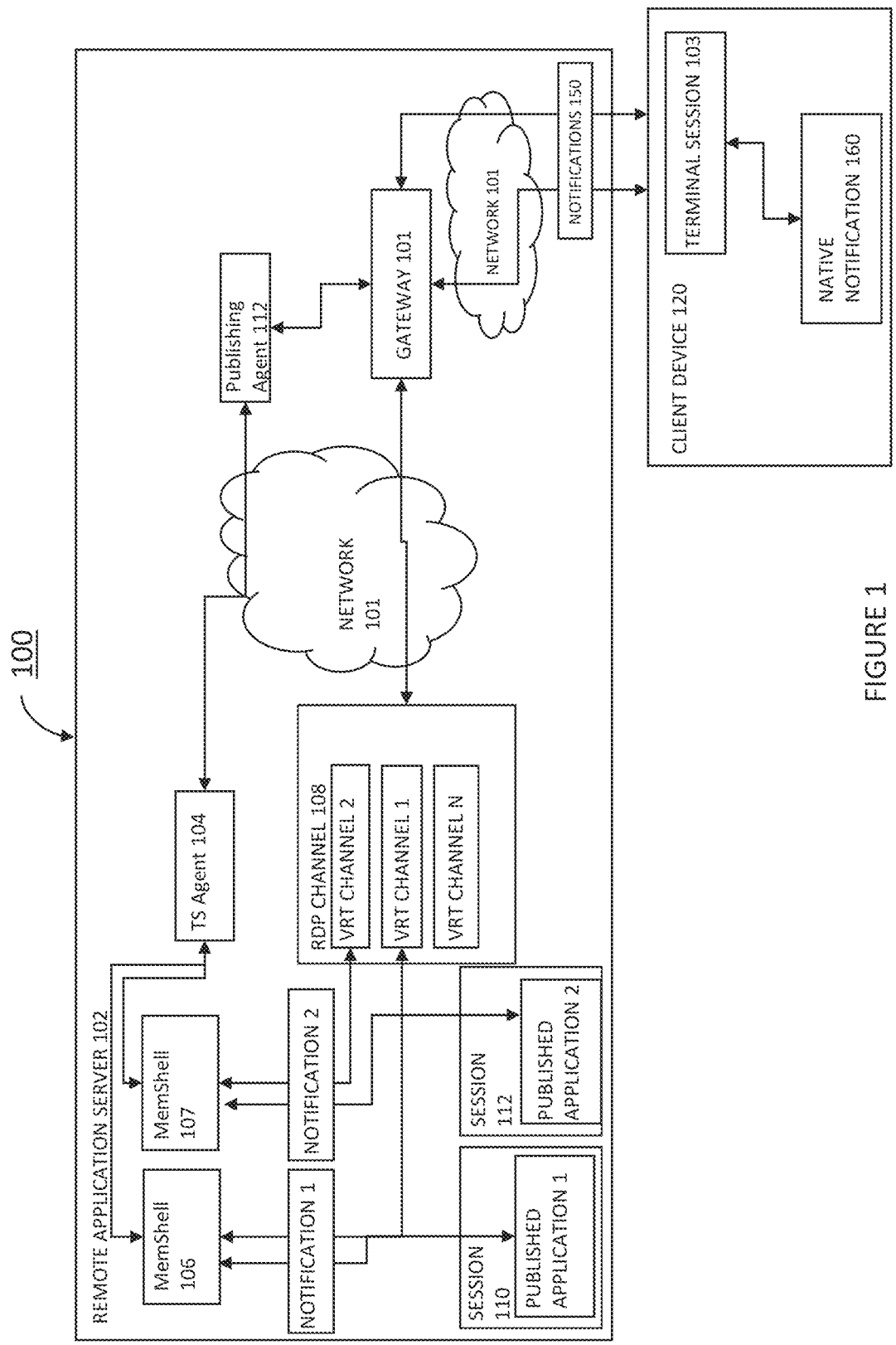
FIG. 1 is a block diagram illustrating a system for managing notifications from published applications according to an exemplary aspect.

Aspects of the present disclosure relate to systems and methods for managing notifications from published applications. Exemplary aspects of the present disclosure propagate application notifications to users at client devices that may otherwise not be captured so that they may be conveyed and viewed at the client device by the user.

According to one exemplary aspect, a method is provided for managing notifications from published applications. The method comprises listening, at a remote application server, for notifications from one or more published applications launched by a user at a client device, detecting a notification from the one or more published applications, forming an intercepted notification packet containing information from the notification, determining whether the client device has enabled polling and adding the notification packet to a queue of notifications when polling is enabled, pushing the queue of notifications when a polling request is received from the client device and pushing the intercepted notification packet when polling is not enabled.

According to another exemplary aspect of the present disclosure, a system is provided for managing notifications from published applications. The system comprises a remote application server comprising a hardware processor; and memory, coupled to the hardware processor, comprising computer-executable instructions that when executed by the hardware processor: listen for notifications from one or more published applications launched by a user at a client device, detect a notification from the one or more published applications, form an intercepted notification packet containing information from the notification, determine whether the client device has enabled polling and adding the notification packet to a queue of notifications when polling is enabled, push the queue of notifications when a polling request is received from the client device and pushing the intercepted notification packet when polling is not enabled.

The system further comprises a client device, the client device comprising: a hardware processor and memory, coupled to the hardware processor, comprising computer-executable instructions that when executed by the hardware processor receiving, at a client device, the intercepted notification packet from the remote application server, wherein a terminal session is established between the client device and the remote application server, extract notification type information from the intercepted notification packet, creating a native notification when the notification type information indicates that the notification is a native notification, creating a browser notification when the notification type information indicates that the notification is a browser notification and pushing the native notification or browser notification to a local operating system of the client device.

According to another exemplary aspect, a computer-readable medium is provided comprising computer-executable instructions that when executed, perform any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

DETAILED DESCRIPTION

Exemplary aspects are described herein in the context of a system, method and computer program product for managing notifications from published applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the present disclosure are directed to managing notifications from published applications in a remote session or applications accessed via a web browser client.

FIG. 1 is a block diagram illustrating example operations of a system 100 according to an exemplary aspect.

The system 100 comprises a remote application server (RAS) 102 and a client device 120. The RAS 102 further comprises a terminal session agent (TS Agent) 104, a first instance of MemShell 106 and a second instance of MemShell 107 and virtual sessions 110 and 112. In some aspects of the present disclosure, the RAS 102 also optionally comprises the publishing agent 112 and/or gateway 101, while in other aspects, the publishing agent 112 and/or the gateway 101 may be hosted remotely from the RAS 102. The client device 120 comprises a terminal session 103 and a native notification 140. In aspects of the disclosure, there may be one or more instances of the MemShell, each corresponding to a session virtual session (e.g., virtual sessions 110 and 112).

The publishing agent 112 controls how remote applications are published for a user of client device 120 to select and launch, or to be made available during a remote desktop session initiated from the client device 120 with the RAS 102. The gateway 101 is configured to route such requests for applications and/or desktop sessions between the client device 120 and the RAS 102. The TS Agent 194 and MemShell (e.g., MemShell 106 and MemShell 107) may be installed for execution on a Terminal Server which serves terminal sessions to clients, which may be the same server or a different server than where the RAS 102 is installed.

At the request of a user, the client device 120 may request the terminal session agent (TS Agent) 104 of the RAS 102 to create a new terminal session 103 across network 101. Once the terminal session is launched, the user can use their local operating system, but may also use a remote operating system through terminal session 103. In another aspect, the client device 120 may launch published application 1 from RAS 102 through, for example, a web browser, a client application, or the like. Another client device may launch published application 2 from their session 112 with RAS 102. Whenever a published desktop session, or a published application session is established between a client device and the RAS 102, one or more virtual remote desktop protocol (RDP) channels are created in order to communicate various data between the client device and the RAS 102. For example, there may be a virtual channel for session logoff data, printing or scanning values, file transfer, passing window positions and the like. In some aspects, a client device 120 may connect via "direct mode", where data is passed directly from the RDP channel 108 to the client device 120. In optional aspects, the data is passed from RDP to the proxy gateway to the client. The gateway 101 may, in some aspects, serve clients that do not have access to a local network by acting as a middleman to direct traffic to the client.

However, if the terminal session 103 or, respectively, the web browser/client is minimized, it is possible that notifications generated by the RAS 102 or Published Application 1 go unnoticed by the user at client device 150. Accordingly, in one aspect of the present disclosure, the MemShell 106 may receive notification 1 from Published Application 1 and MemShell 107 may receive notification 2 from Published Application 2. An RDP channel 108 may already be established when the terminal session 103 between the client device 120 and the RAS 102 was established. MemShell 106 corresponding to the particular terminal session 103 and MemShell 107, corresponding to a terminal session on another client device, may intercept these notifications and create intercepted notification packets, according to one aspect and create or use existing virtual RDP channels of the RDP channel 108. These virtual channels are then used by the MemShell instances to push notifications 150 to the client device, in addition to the other virtual channels that pass data between the RAS 102 and the client devices. For example, MemShell 106 uses virtual channel 1 for and MemShell 107 uses virtual channel 2, which are routed through gateway 101, and notifications 150 are pushed to the client device 120. In one aspect, a notification may be pushed to the client device immediately after it is intercepted at the corresponding instance of MemShell. In another aspect, the client device 120 may poll the RAS 102 for notifications 150 and each notification is queued until the RAS 102 receives a polling request. According to one aspect, the notifications may be notifications from applications, administrative notifications from the RAS 102, notifications that the user has subscribed to at the terminal session such as server notifications, news notifications, operating system notifications or the like.

The client device 120 receives the notifications 150 and generates native notifications 160, which are presented to the underlying operating system, not through the terminal session 103, in order to notify the user in case the terminal session 103 is minimized, in the background, not visible for various reasons, or not caught at all because notifications are not captured as part of win. Similarly, if the user was using a browser to launch published applications, the native notification 160 is generated by the client through a specialized component of the client device discussed with respect to FIG. 4. Therefore, the browser notification may also be presented to the user as a native operating system notification even if the browser is minimized, in the background, or not visible for other various reasons. Accordingly, notifications generated in the terminal session are replicated as native notifications visible to the user of the client device 120 outside of the terminal session 103, preserving the notification for the user to consume instead of the notification being lost in the terminal session without the user being notified.

Figure 2:
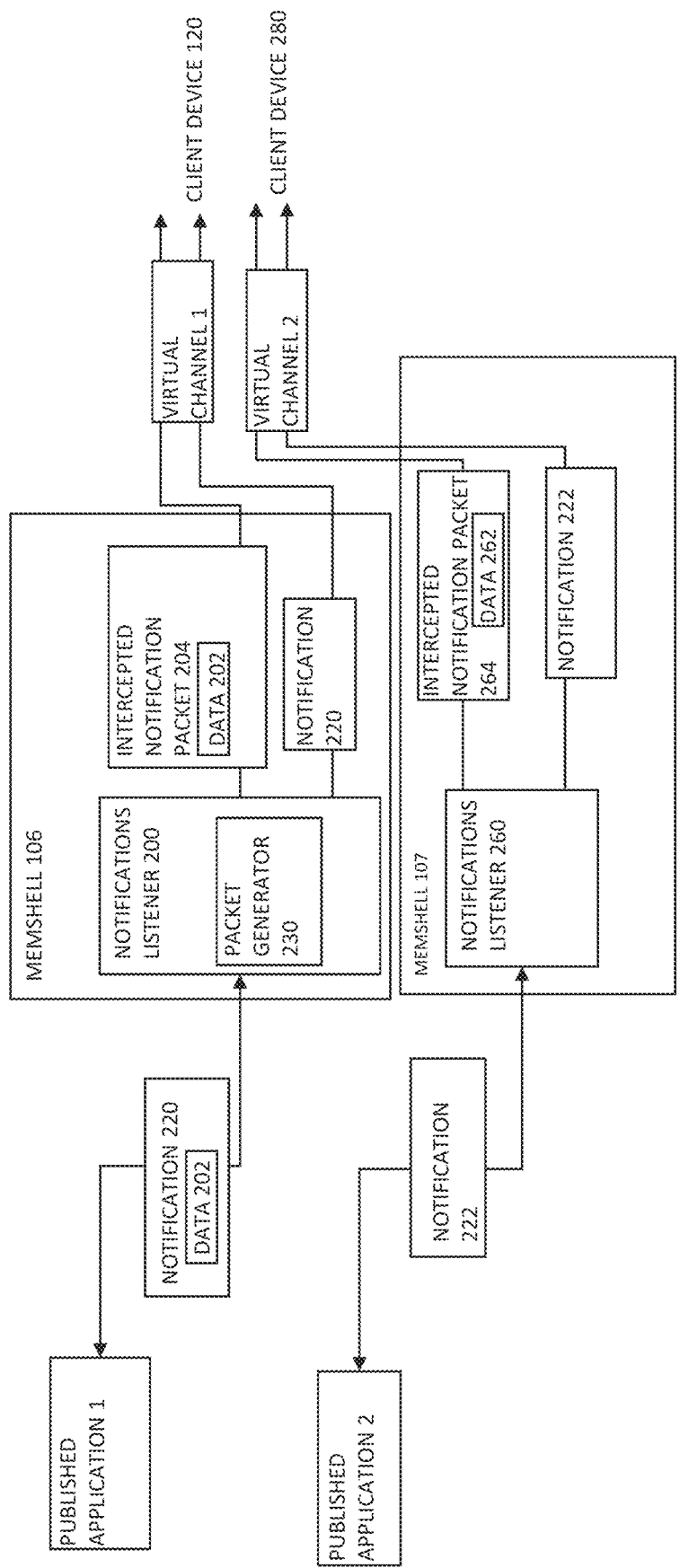
FIG. 2 is a block diagram illustrating details of operation of the Mem Shell according to an exemplary aspect.

FIG. 2 is a block diagram detailing the operation of the MemShell in accordance with aspects of the present disclosure. The instances of MemShell 106 and MemShell 107 are processes running on a server (e.g. a Windows Server), from which applications or desktops are published on a terminal server for instance. Each instance of MemShell (e.g., Mem- Shell 106 and MemShell 107) is a process running on a server from which the application/desktop is published, for instance on the Terminal Server. The MemShell communicates with the client device to pass and receives information regarding the session and takes care of certain tasks such as session logoff, printing/scanning default values, file transfer, passing seamless windows' positions etc. In one aspect of the present disclosure, notifications details are communicated to the client device, which may be caught from the session on the TS and passed on to the client device.

In one aspect, MemShell 106 may be communicating information related to a terminal session (e.g., terminal session 103 of FIG. 1). The terminal session 103 may include a user of device 120 launching published application 1. In one example, published application 1 is a text messaging application that produces text notifications once a message received. An example notification is notification 220 containing data 202 and notification 222. The notifications 220 and 222 may be a TOAST notification, a native operating system notification, e.g., Windows notification, an OSX notification, an Android notification, or anything similar. Similarly, another MemShell instance 107 hosts a terminal session from client device 280 that has launched Published Application 2.

The MemShell 106 also comprises a notification listener 200 which listens for notifications. According to one aspect of the disclose, the notification listener 200 intercepts notification 220 from published application 1. In one aspect, the notification listener 200 may use an operating system level API that alerts the listener 200 to the presence of a notification, for example a Windows API or an OSX API. In one exemplary aspect, the notification listener 200 may comprise a packet generator 230, which optionally extracts the data from 202 and encapsulates the data 202 into an intercepted notification packet 204. Similarly, the notification listener 260 listens for notifications from Published Application 2 (and any applications being executed in session 112) and generates an intercepted notification packet 264, or pushes notification 222 in its original form to the client device 280 over virtual channel 2. Accordingly, a notification listener is instantiated by each MemShell instance and functions in the same way as other notification listeners, listening to published applications in their corresponding session and pushing intercepted notification packets, or the actual notifications to the client devices.

According to one aspect, the notification listeners 200 and 260 may save corresponding notification data, e.g., the data 202, in JSON, xml or textual format, though the present disclosure does not limit the formats herein. The intercepted notification packet 204 is pushed to the client device 120 via, for example, virtual channel 1, or any available virtual channel. In another aspect, the packet generator 230 merely pushes the entire notification 220 as intercepted and forwards the notification 220 to the client device 120 across virtual channel 1.

Similarly, the intercepted notification packet 264 is pushed to the client device 280 via, for example, virtual channel 2, or any available virtual channel. In another aspect, the notification listener merely pushes the entire notification 222, as intercepted, and forwards the notification 222 to the client device 120 across virtual channel 2.

According to one aspect, each of the intercepted notifications may be saved to a database and the notification listener 200 is configurable to save certain application notifications into the database.

Figure 3:
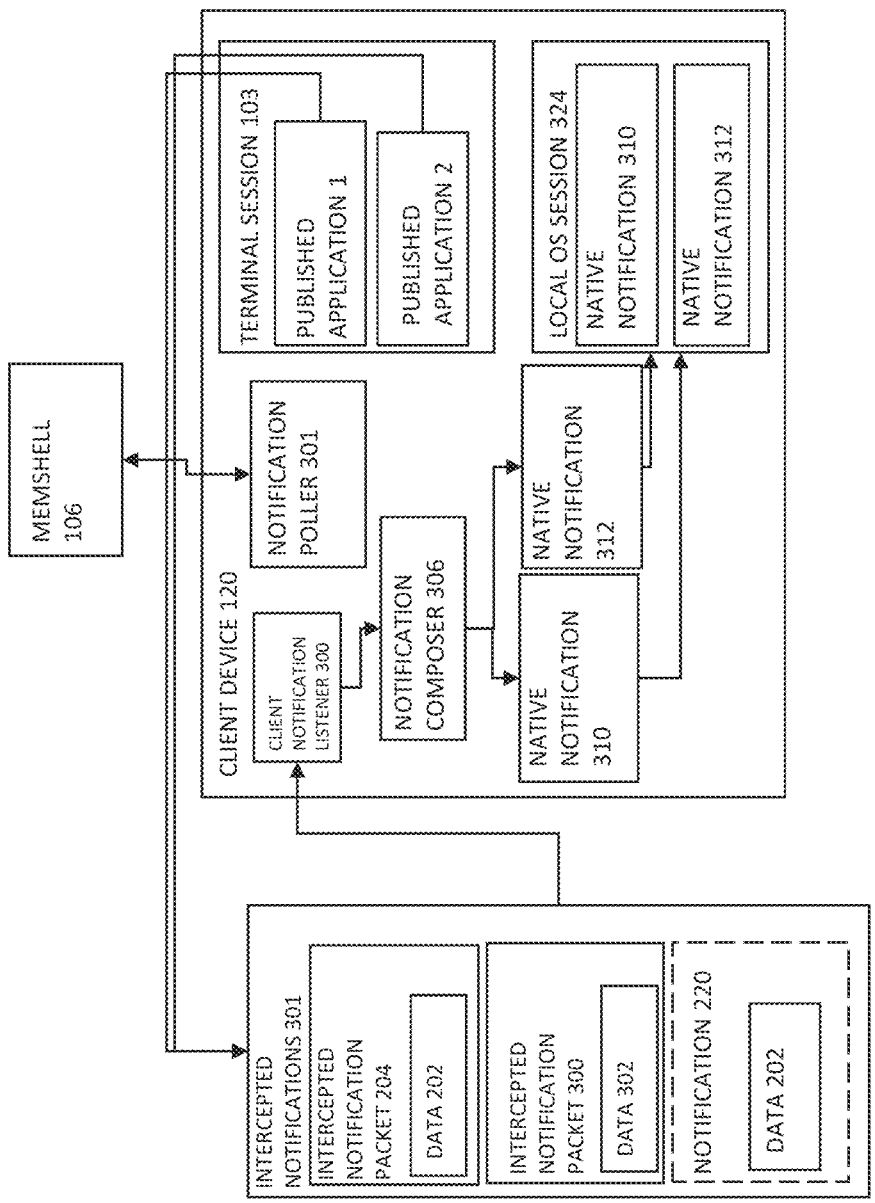
FIG. 3 is a block diagram illustrating reception of the notifications at the client device according to an exemplary aspect.

FIG. 3 is a block diagram of the intercepted notification packet 204 or notification 220 being received by the client device 120.

In one exemplary aspect, the client device 120 may comprise a notification listener 300, a notification composer 306, a terminal session 103 and a local operating system session 324. When the client device 120 is started, the local operating system session 324 is launched.

The local OS session 324 receives, from an instance of the MemShell, e.g., MemShell 106, notifications associated with published applications running in the terminal session and presents the received notifications to the user during the local OS session 324. While the notifications may be presented in the terminal session 103 as the published applications issue the notifications, in some aspects of the disclosure the terminal session 103 may be minimized while a user is performing actions on their local OS session 324. In other instances, notifications are not shown at all in terminal sessions even when the session window or application window is not minimized because the notifications are not being captured as part of the application window. Thus, there is a need to make the notification known to the user despite the status of the terminal session 103.

As described above, in some aspects the notification listener 200 may generate new intercepted notification packet 204 containing data 202 and intercepted notification packet 300 with data 302 to send to client device 120, while in other aspects, the original notifications 220 and 222 are pushed to the client device by a notification listener (e.g., notification listener 200 and 260) when published applications are being used.

At the client device 120, the client notification listener 300 listens for notifications in all form, whether it be TOAST, APNS, native windows notification and in all formats, whether in native notification format, or intercepted notification format. According to one example, the client notification listener 300 may receive an entire object intercepted notifications 302 containing all notifications from published applications 1 and 2 executing in terminal session 103 upon request when the client notification listener 300 is configured in a polling mode.

In another example, the MemShell 106 may push each notification to the client device 120 when the notification is created by the published application 1 or 2 via an already established virtual channel of communication between the client device 120 and the RAS 102, or create such a virtual channel. All communication between MemShell instances and client devices may be passed through an RDP Server (not shown) and the Gateway 101 via an RDP virtual channel. The MemShell instances may create a virtual channel to pass data to client devices, similarly as other data (such as data related to the Published Application 1 and 2) are passed from the MemShell to the client. In one aspect, the channel of communication is RDP and the notifications are sent via a virtual channel of the RDP channel between the RAS 102 and the gateway 101.

The client device 120 may further comprise a notification composer 306 which composes desktop notifications for delivery to the underlying client operating system 320. The notifications, e.g., native notification 310 and native notification (alternatively "desktop notifications") 312 are in native format with notifications that the operating system 320 can interpret. The local OS session 324 receives the native notifications 310 and 312 and presents the notifications to the user during the local OS session 324. While the notifications may be presented in the terminal session 103 as the published applications issue the notifications, in some instances the terminal session 103 may be minimized while a user is performing actions on their local OS session 324. Therefore, the native notification 310 and the native notification 312 are pushed to the local OS session 324, visible to the user.

In another aspect of the disclosure, if the client notification listener 300 receives notification 220, i.e., the notification in its original form, the client notification listener 300 forwards the notification 220 directly to the local OS session 324 via native API calls of the client operating system 320.

In one aspect of the disclosure, the client device 120 further comprises a notification poller 301 which polls the MemShell 106 according to a user specified time period. In this aspect, the MemShell 106 will not push notifications directly to the client, but add the notifications to a queue until the queue is emptied by the notification poller 301.

Figure 4:
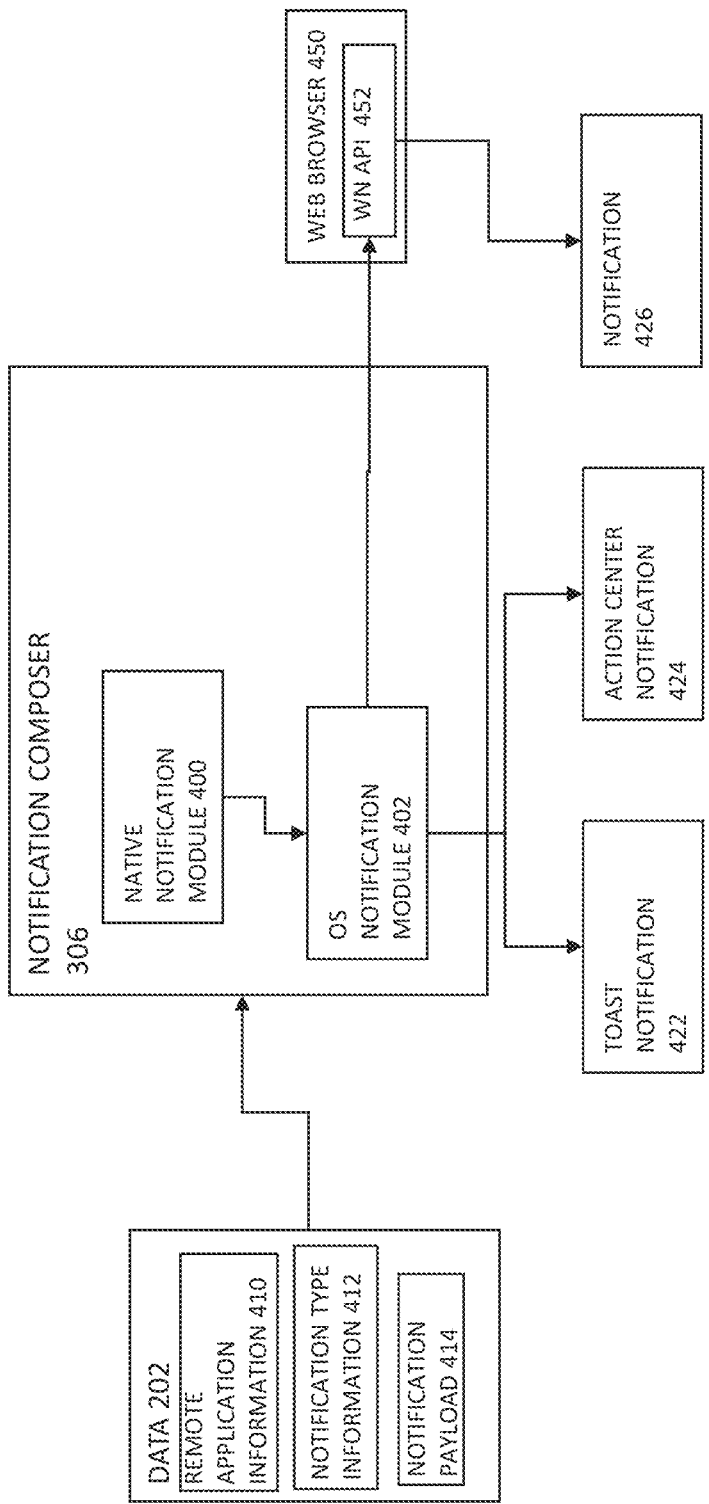
FIG. 4 is a block diagram illustrating operations of the notification composer at the client device according to an exemplary aspect.

FIG. 4 is a block diagram of the notification composer 306 of the client device 120. In one aspect of the disclosure, the notification composer 306 may comprise a native notification module 400 and an OS notification module 402.

The notification composer 306 receives notification 220 comprising data 202. The data 202 comprises, in one aspect, remote application information 410, notification type information 412 and the notification payload 414.

The native notification module 400 may extract each of the remote application information 410, notification type information 412 and the notification payload 414 and generates a notification based on the notification type information 412. For example, the native notification module 400 invokes the OS notification module 402 for operating system specific notifications such as a toast notification 422 or an action center notification 424.

The OS notification module 402 is not limited to these types of OS level notifications and is configurable to construct any format of OS level notifications. According to one aspect, the notification 220 may be constructed by the RAS 102, containing data 202 that contains a message from the administrator of the RAS 102 or an error message from RAS 102.

Figure 5:
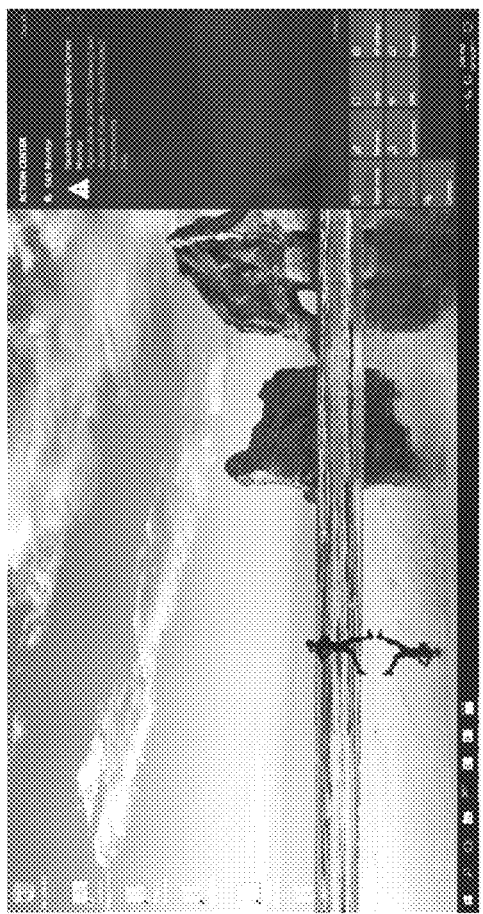
FIG. 5 is an illustration of example notifications received at a desktop client according to an exemplary aspect.
Figure 5:
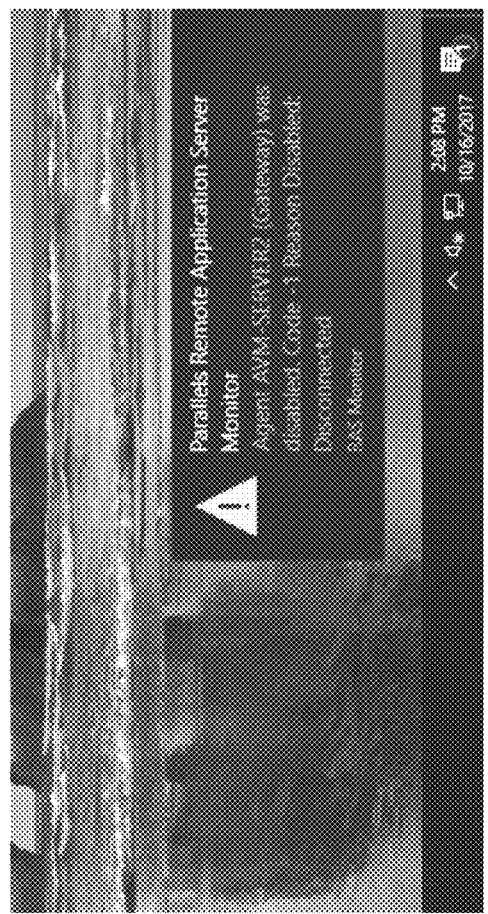

FIG. 5 illustrates an example action center notification in screen 500 from the RAS console in the form of an administrative message.

Screen 502 of FIG. 5 illustrates another administrative notification from the RAS 102 but in the form of a desktop TOAST notification. Therefore, even when a terminal session is minimized, out of view, or the notifications in the published desktop or application are not captured, notifications from the published applications, or administrative messages from an administrator of the RAS 102 are presented at the client device 120. In this aspect, the notification is propagated from the published application to the client device.

If the native notification module 400 determines that the notification type information 412 indicates that the type is a browser notification, the native notification module 400 calls a Web Notifications API 452 of the Web Browser 450 to generate the notification 426. In one aspect, the notification 426 is an OS notification, while in another aspect, the notification 426 is a browser notification.

Figure 6:
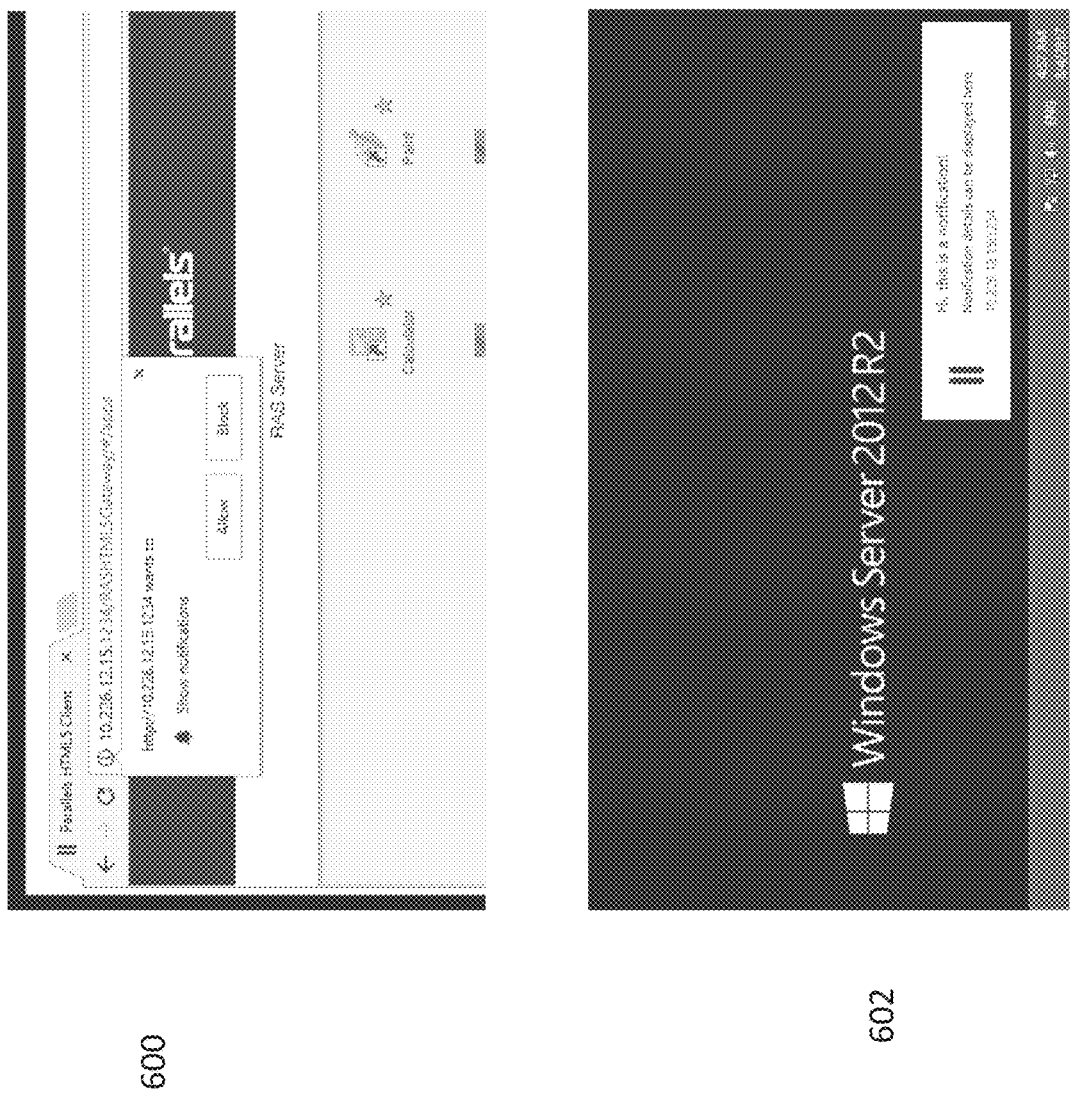
FIG. 6 is an illustration of example notifications received at a browser client according to an exemplary aspect.

The WN API 452 is also configurable to allow the notification 426 to appear even when the web browser 450 is not in the foreground or is minimized by a user in the local OS session 324. FIG. 6 illustrates an example of a notifications using a WN API 452. In screen 600, a user accesses remote applications via a site on a web browser. The site indicates that the browser would like to send notifications to the client device. Accordingly, even when the browser or published application is minimized as shown in screen 602, notifications from published applications used in the browser session can be conveyed to the user as desktop notifications, thus presenting the notification to the user at the client device 120. Without such an arrangement, the notification would be generated and consumed at the terminal session, or not captured at all as part of data transmitted to the client representing a published application.

Figure 7A:
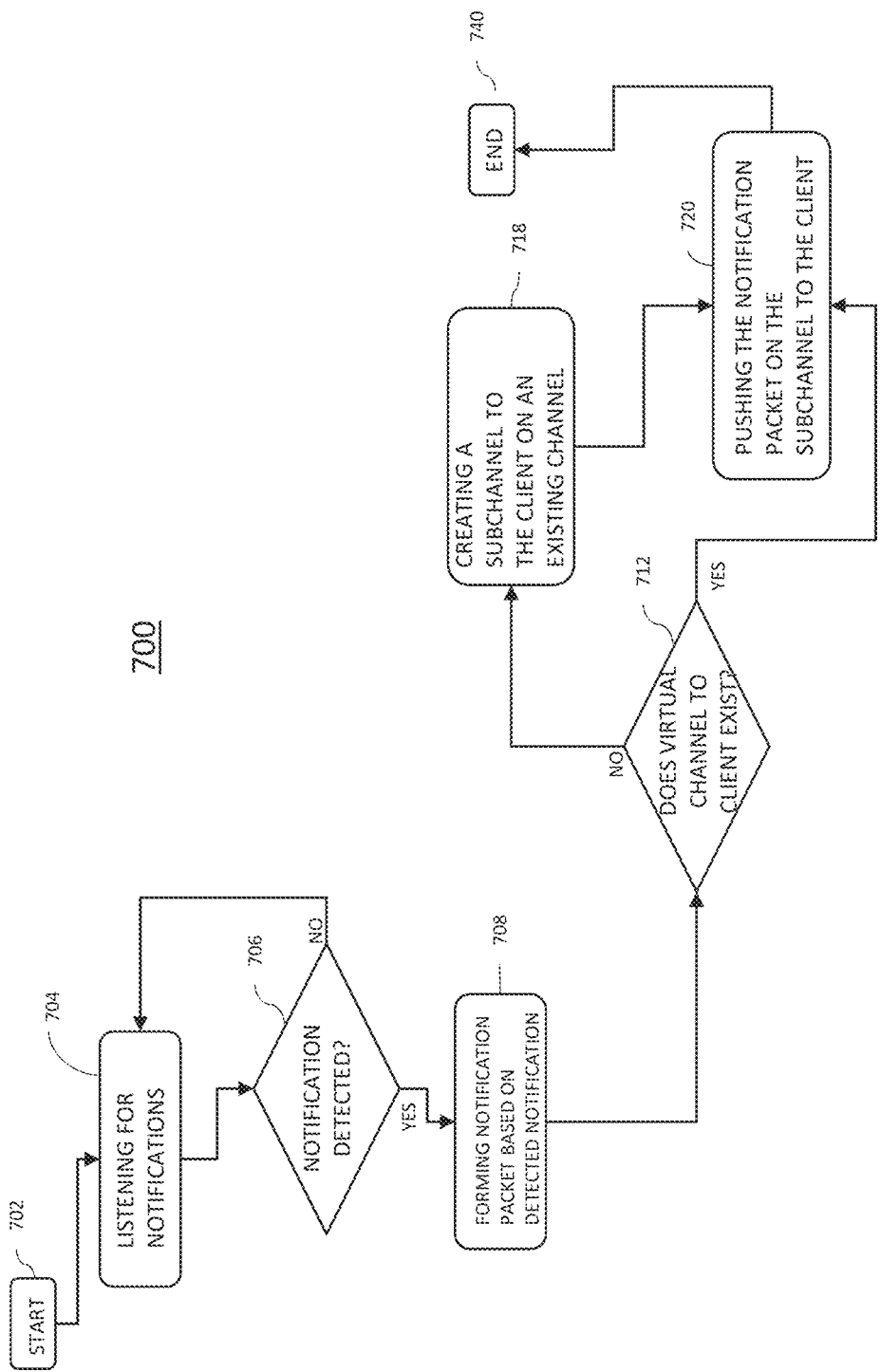
FIG. 7A is a flowchart illustrating a method managing for notifications from published applications according to an exemplary aspect.

FIG. 7A is a flow diagram for a method 700 for managing notifications from published applications. The MemShell 106 and 107 are example implementations of the method 700, as executed by processor 21 of the computer system shown in FIG. 9.

The method begins at 702 and proceeds to step 704. At 704, the notification listener 200 listens for any notifications from published applications at a MemShell instance, for example the MemShell 106. At 706, if a notification is detected, the method proceeds to 708. If a notification is not detected, the method returns to 704 to listen for notifications.

At 708, the packet generator 230 may form an intercepted notification packet based on the detected notification, encapsulating the data contained in the notification. In another aspect, the packet generator 230 forwards the notification in its detected form onto the client device.

At 712, the MemShell 106 may determine whether a virtual channel to the client device whose terminal session generated the notifications already exists. If at 712, the sub-channel does not exist, the MemShell 106 creates a communications virtual channel (e.g., a virtual RDP channel) to the client in an existing communication channel between the client device 120, for example, and the MemShell 106 at step 718. If, at 712, a virtual channel already exists, the method proceeds to step 720. At 720, the notification packet is forwarded on the virtual channel to the client. The method terminates at step 720.

Figure 7B:
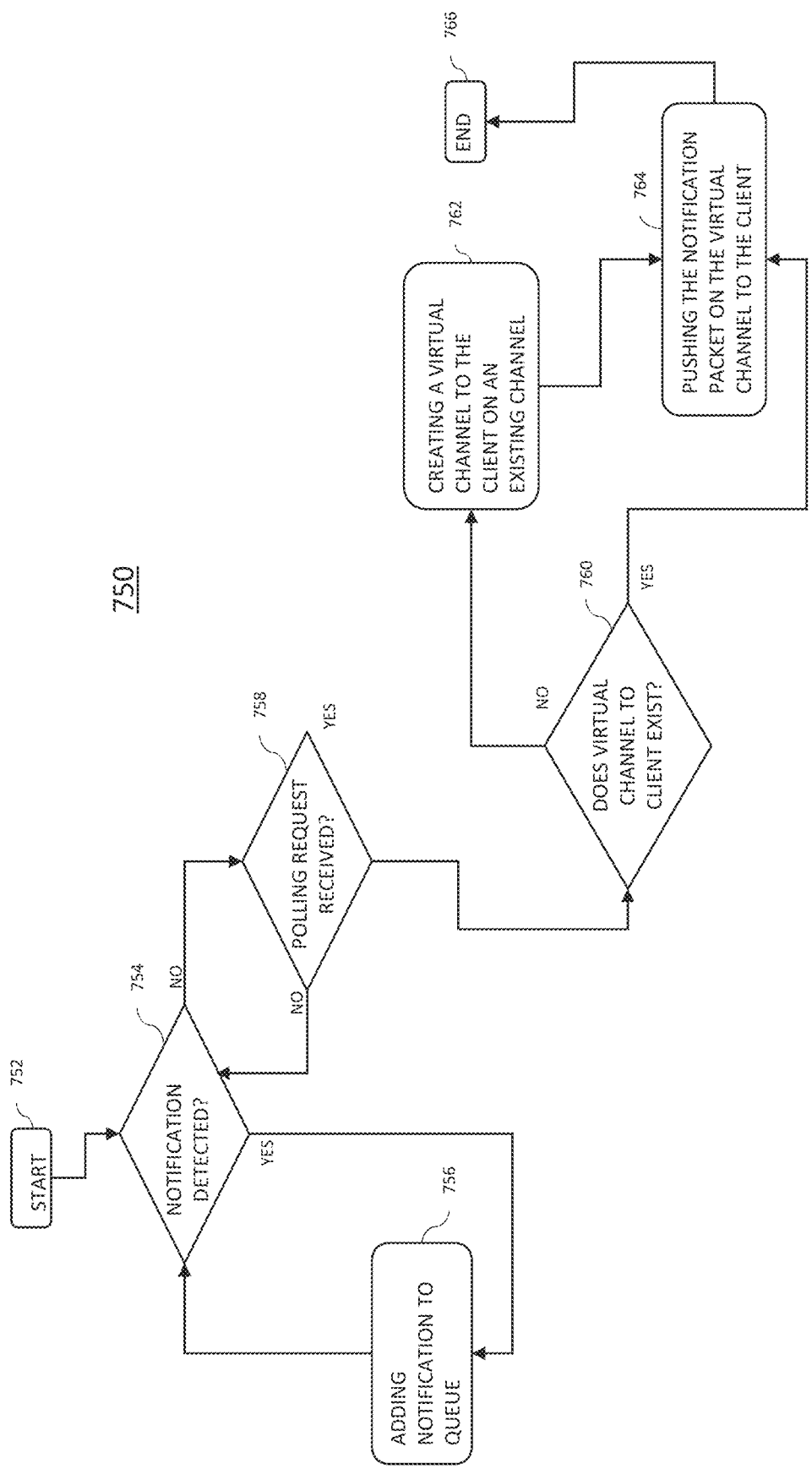
FIG. 7B is a flowchart illustrating another method for managing notifications from published applications according to an exemplary aspect.

FIG. 7B is a flow diagram for a method 750 for managing notifications from published applications. The MemShell 106 and 107 are example implementations of the method 750, as executed by processor 21 of the computer system shown in FIG. 9.

The method begins at 752 and proceeds to 754. At 754, a notification listener (e.g., 200 or 260 shown in FIG. 2) determine whether a notification is detected from a published desktop or published application. If there is a notification, the method 750 proceeds from 754 to 756, where the notification is added to a queue or list of notifications.

If no notification is detected, an instance of the MemShell (e.g., 106 or 107) determines whether a polling request is received from a client device at 758. The polling request indicates that a particular client polls for notifications instead of being sent the notifications immediately as they are generated by a published desktop or published application. If a polling request is not received, the method returns to 754.

Otherwise, the method proceeds to step 760, there the MemShell determines whether a virtual channel exists between the client and the RAS 102. In some aspects, the virtual channel is a virtual RDP channel. If a virtual channel does exist, the method proceeds to 764 where the notification packet comprising the list/queue of notifications that have been collected prior to the polling request from the client is pushed to the client via the virtual channel. Otherwise, the virtual channel is created at 762 on an existing channel (e.g., RDP channel). The method terminates at 766.

Figure 8:
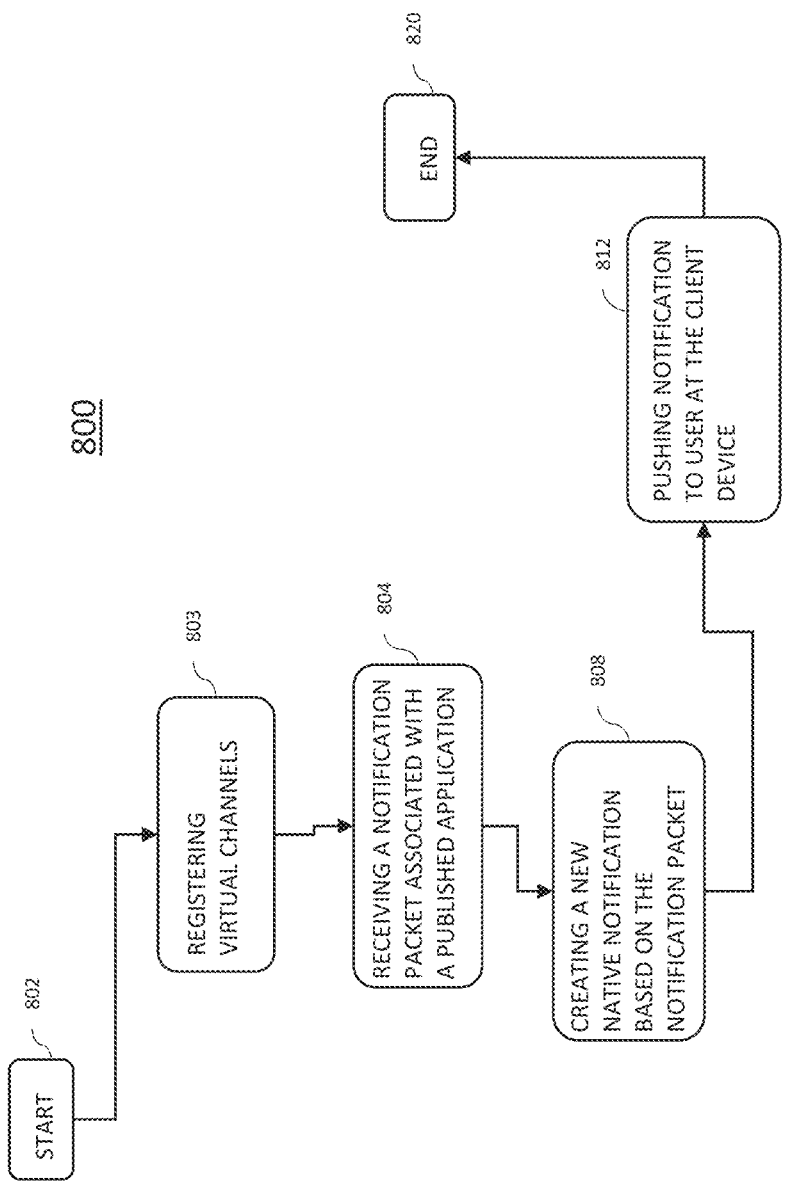
FIG. 8 is a flowchart illustrating a method for receiving notifications according to an exemplary aspect.

FIG. 8 is a flow diagram for a method 800 for receiving notifications at a client device. The client device 120 is an exemplary implementation of the method 800, as executed by a processor such as the processor 21 illustrated in FIG. 9.

The method begins at 802 and proceeds to 803 where the client device 120 registers one or more virtual channels for data communication with the RAS 102. In some aspects, these virtual channels are virtual RDP channels, while other channels may also be used. At least one of the virtual channels being registered is a virtual channel for receiving notifications from a MemShell instance.

At 804, a notification packet is detected by the client notification listener 300 associated with a published application in the terminal session or browser session executing on the client device.

The notification composer 306 may invoke the OS notification module 402 at 808. The notification composer inspects the notification type information (e.g. notification type information 412) contained in the notification. According to the type information, at 812, the notification composer pushes the native notification to the client device by invoking OS level APIs which interact with the local OS session active on the client device so that the user is aware of the issue referenced in the notification concerning one or more published applications, instead of subduing the notification at the application server. In some instances, the notification composer 306 calls a web notifications API (e.g., WN API 452) to generate OS notifications. In some other instances, the native notifications are pushed directly to a web browser executing on the local device at 812. The method terminates at 820.

Figure 9:
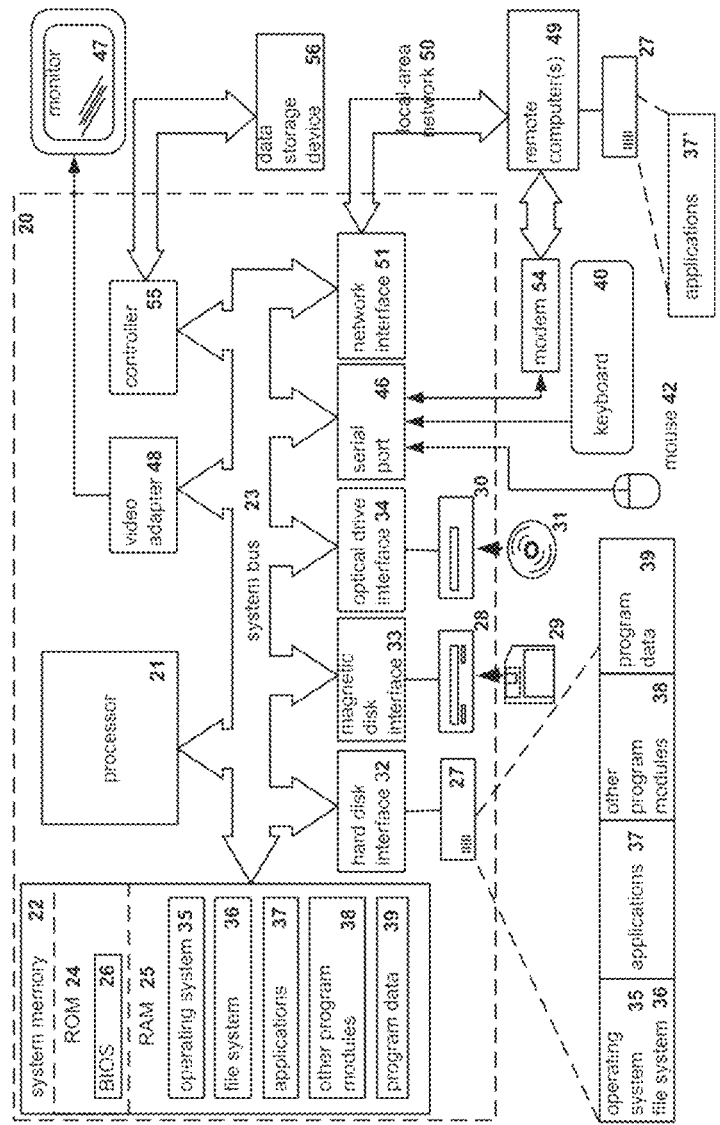
FIG. 9 is a block diagram of a general-purpose computer system on which the disclosed system and method can be implemented according to an exemplary aspect.

FIG. 9 is a block diagram illustrating a general-purpose computer system 20 on which aspects of systems and methods for managing notifications from published applications may be implemented in accordance with an exemplary aspect. It should be noted that the computer system 20 can correspond to the system 100, each of the client devices 150, the RAS 102, and/or individual components of the RAS 102, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for managing notifications from one or more published applications, comprising:
   sending, by a server to a client device, a request to enable notifications;
   detecting, by the server, a notification from the one or more published applications launched by a user at the client device;
   forming a notification packet containing information from the notification; and
   causing the notification packet to be provided to the client device; wherein
   the client device is to create the native notification using a web notifications API based on the notification packet;
   the native notification is to be displayed at the client device while a web browser window on the client device is one or more of minimized, closed or in a background; and
   the client device is to extract notification type information from the notification packet, create a native notification based on the notification type information and client device information, and to push the native notification to a local operating system of the client device.

2. The method of claim 1, wherein causing the notification packet to be provided to the client device comprises:
   determining whether the client device has enabled polling;
   responsive to determining that the client device has enabled polling, adding the notification packet to a queue of notifications to be accessed in response to a subsequent polling request from the client device; and
   responsive to determining that the client device has not enabled polling, sending the notification packet to the client device.

3. The method of claim 1, further comprising:
   listening, by the server, for the notifications from the one or more published applications.

4. The method of claim 1, further comprising:
   determining whether a virtual channel with the client device exists, and
   responsive to determining that the virtual channel with the client device does not exist, creating the virtual channel with the client device.

5. The method of claim 4, further comprising:
   storing the notifications from the one or more published application in a database; and
   sending the notifications to the client device using a delivery option other than the virtual channel with the client device.

6. The method of claim 5, wherein
   the delivery option is an email address of the user of the client device.

7. The method of claim 1, wherein
   the notification packet is provided to the client device over a remote desktop protocol (RDP) virtual channel.

8. The method of claim 1, wherein
   the one or more published application are launched using a terminal session from the client device.

9. The method of claim 1, wherein
   the one or more published applications are launched using a web browser.

10. The method of claim 1, further comprising:
    sending, by the server, administrative messages using the notification packet.

11. The method of claim 1, wherein
    the native notification is one of a TOAST notification and an Action Center notification.

12. The method of claim 1, wherein
    the client device is to make a native API call to create the native notification and display the native notification.

13. A server system comprising:
    a memory storing instructions; and
    a processor to execute the instructions to perform operations comprising:
    sending, by the server system to a client device, a request to enable notifications;
    detecting a notification from one or more published applications launched by a user at the client device;
    forming a notification packet containing information from the notification; and
    causing the notification packet to be provided to the client device; wherein
    the client device is to create the native notification using a web notifications API based on the notification packet;

the native notification is to be displayed at the client device while a web browser window on the client device is one or more of minimized, closed or in a background; and the client device is to extract notification type information from the notification packet, create a native notification based on the notification type information and client device information, and to push the native notification to a local operating system of the client device.

14. The system of claim 13, wherein
causing the notification packet to be provided to the client device comprises:
- determining whether the client device has enabled polling;
- responsive to determining that the client device has enabled polling, adding the notification packet to a queue of notifications to be accessed in response to a subsequent polling request from the client device; and
- responsive to determining that the client device has not enabled polling, sending the notification packet to the client device.

15. The system of claim 13, wherein
the operations further comprise:
- determining whether a virtual channel with the client device exists, and
- responsive to determining that the virtual channel with the client device does not exist, creating the virtual channel with the client device.

16. A non-transitory computer-readable medium storing instructions, which when executed by a processor, cause the processor to perform operations comprising:
- sending, by a server to a client device, a request to enable notifications;
- detecting, by a server, a notification from one or more published applications launched by a user at a client device;
- forming a notification packet containing information from the notification; and
- causing the notification packet to be provided to the client device; wherein
- the client device is to create the native notification using a web notifications API based on the notification packet;
- the native notification is to be displayed at the client device while a web browser window on the client device is one or more of minimized, closed or in a background; and
- the client device is to extract notification type information from the notification packet, create a native notification based on the notification type information and client device information, and to push the native notification to a local operating system of the client device.

17. The non-transitory computer-readable medium of claim 16, wherein causing the notification packet to be provided to the client device comprises:
- determining whether the client device has enabled polling;
- responsive to determining that the client device has enabled polling, adding the notification packet to a queue of notifications to be accessed in response to a subsequent polling request from the client device; and
- responsive to determining that the client device has not enabled polling, sending the notification packet to the client device.

18. The non-transitory computer-readable medium of claim 16, wherein the operations further comprise:
- determining whether a virtual channel with the client device exists, and
- responsive to determining that the virtual channel with the client device does not exist, creating the virtual channel with the client device.

* * * * *